United States Patent Office 3,546,346
Patented Dec. 8, 1970

3,546,346
SYSTEMIC PLANT AND SEED FUNGICIDE COMPRISING 1,1,1 - TRICHLORO - 2 - HYDROXY-3-NITROPROPANE
Constantine Katsaros and William Calvin Martin, Crystal Lake, Ill., assignors to Morton International, Inc., Chicago, Ill., a corporation of Delaware
No Drawing. Original application Mar. 11, 1968, Ser. No. 711,849. Divided and this application Mar. 24, 1969, Ser. No. 833,222
Int. Cl. A01n 9/20
U.S. Cl. 424—343                         3 Claims

ABSTRACT OF THE DISCLOSURE

A method of systemically controlling fungal infections of plants and seeds by the application of 1,1,1-trichloro-2-hydroxy-3-nitropropane.

---

This invention is a division of our application Ser. No. 711,849, filed Mar. 11, 1968, now abandoned.

BACKGROUND OF THE INVENTION

Field of the invention

This invention relates to the chemotherapeutic or systemic control of fungal infections which are already established in seeds or plants and/or to the regulation of growth of plants and seedlings.

Description of the prior art

The contact fungicidal, bactericidal and insecticidal activities of 1,1,1-trichloro-2-hydroxy-3-nitropropane have been investigated. M. Koremura published in the Journal of Japanese Agricultural Chemical Society, vol. 36, pp. 473–479 (1962), a description of his synthesis of "1-trichloro-3-nitropropanol-2" (a synonym for 1,1,1-trichloro-2-hydroxy-3-nitropropane) and testing thereof as a contact fungicide, bactericide, and insecticide. The conclusion reached was that this compound (and other trichloronitro alcohols) failed to demonstrate any antimicrobial (fungal and/or bacterial) activity whatsoever.

The contact fungicidal activity of 1,1,1-trichloro-2-hydroxy-3-nitropropane together with its homologues and analogues was also investigated by A. N. Bates, D. M. Spencer, and R. L. Wain, and reported in Ann. Appl. Biol., vol. 51, pp. 153–160 (1963) in an article titled "The Antifungal Activity of Certain Hydroxy Nitro Alkanes and Related Compounds." It was concluded that the group of compounds including 1,1,1-trichloro-2-hydroxy-3-nitropropane "showed only poor fungicidal activity" and was therefore not worthy of further investigation. This conclusion was based on laboratory tests in which inhibition of mycelial growth of fungi was attempted by direct contact of the organisms with the test compound. There are no literature references to the use of 1,1,1-trichloro-2-hydroxy-3-nitropropane as a plant growth regulant.

The control of fungal diseases in general and of the smut diseases in particular has always been a serious problem. Particularly resistant to control and eradication have been flag smut, *Urocystis agropyri* (Preuss) Schroet., loose smut, *Ustilago nuda* (Jens.) Rostr., and stripe smut, *Ustilago striiformis* (West.) Niessl. At present there are no commercially available chemotherapeutic agents for the systemic control of these diseases.

Therefore, it would be desirable to provide an improved process for systemically controlling fungal infections which are already established in plants or seeds and to prevent or ameliorate the pre-emergence of post-emergence infection of seedlings in nurseries, green houses and farms. It would also be desirable to provide a plant growth regulant process for regulating the growth of plant life including seeds, plants and seedlings, etc.

SUMMARY OF THE INVENTION

Accordingly, in one broad form, the present invention comprises a process for systemically controlling pathogenic fungi by applying to infected seeds, plants, or infested soil the compound 1,1,1-trichloro-2-hydroxy-3-nitropropane, and/or regulating the growth of plant life. Broadly the amount of the aforenoted compound applied to the soil broadcast is as low as ¼ pound per acre, preferably from about ½ to about 60 pounds per acre. The compound may be applied at a dosage rate in excess of about 60 pounds per acre, but may result in phytotoxic manifestations. A preferred range is from ½ to about 40 pounds per acre. Commercially, seed treatments are customarily recommended on the basis of ounces per hundredweight or per bushel. This can be expressed in parts per million as a least 1 p.p.m. and up to as much as 10,000 p.p.m. (1%) or more. A preferred range is from 40 to 4,000 p.p.m. The upper limit is again determined by the phytotoxic manifestations encountered by the treatment or for economic reasons.

In view of the lack of contact fungicidal activity attributed to the 1,1,1-trichloro-2-hydroxy-3-nitropropane by the cited investigators, it was entirely unexpected and surprising to discover its systemic fungicidal properties. Systemic activity by a chemotherapeutic agent refers to the translocation of the chemical from the site of application into and through the vascular system of the plant whence it is distributed throughout the plant tissues without appreciable phytotoxic effect. Obviously this is a complex process which is unpredictable, and is encountered much more infrequently than superficial or contact activity.

The 1,1,1-trichloro-2-hydroxy-3-nitropropane is conveniently applied to infected seeds or plants or to their habitats in an aqueous solution. Alternately, the compound may be applied in combination with inert, inactive diluents or carriers whether liquid, solid, or semi-solid in form. Such diluents and carriers aid in the distribution of the compound. Exemplary of solvents which may be used as diluents are water, alcohols, ketones, esters, chlorinated solvents, deodorized kerosene, various low boiling petroleum fractions, aromatic solvents, etc. Other suitable carriers of the type commonly employed in preparing fungicidal compositions include solid extending agents which may be either inorganic or organic in nature, or a combination of both. The inorganic extending agents may include, for example, clay, talc, fuller's earth, bentonite, diatomaceous earth, kieselguhr, salt cake (sodium sulfate), calcium carbonate, magnesium oxide, trisodium phosphate, mineral silicates and sand. The organic extending agents include, for example, wood flour, cork flour, and various comminuted vegetable barks and shells.

Surface active agents may also be employed to aid in the dispersion or emulsification of the chemical. These include the well known anionic, nonionic and cationic surface active materials which are commonly used to prepare dispersions, emulsions and wettable powders.

The mode of application, depending of course on the physical form of the composition containing the chemical, may be by spraying, injecting, drenching, dusting, or otherwise mixing the chemical with seeds or soil or applying it to the plants.

DESCRIPTION OF THE PREFERRED EMBODIMENT

The following examples will illustrate the systemic activity and efficiency of the chemical in various dosages against fungi of the genera selected from the group consisting of *Ustilago striiformis*, *Urocystis agropyri*, and *Ustilago nuda*.

Example 1

The ability to control the plant disease, stripe, smut, caused by *Ustilago striiformis* (West.) Niessl, when already established in plants, was evaluated by employing the following technique.

Tests were conducted with infected plants of Merion Kentucky Bluegrass grown in the greenhouse. Plants with infection evident in every tiller were grown in steam-sterilized sandy-loam soil, 3.5 inches deep in 4-inch square plastic pots. Drain holes in the bottom of the pots were sealed with plastic adhesive tape immediately before addition of the chemical. The chemical in a water solution was added by means of a syringe into 2 cm. deep openings in the soil surface at four locations in each pot. Activity was evident by complete inhibition of visible symptoms of stripe smut in living leaves of individual tillers. The results were as follows:

TABLE 1

[Inhibition of stripe smut, *Ustilago striiformis* (West.) Niessl., in Merion Kentucky Bluegrass]

| Treatment | Rate (lbs. per acre) | Percent control — Weeks after treatment | | | | | | | | | |
|---|---|---|---|---|---|---|---|---|---|---|---|
| | | 0 | 4 | 5 | 6 | 7 | 8 | 10 | 12 | 16 | 17 |
| Control | None | 0 | 0 | 0 | 0 | 0 | 0 | 0 | 0 | 0 | 0 |
| 1,1,1-trichloro-2-hydroxy-3-nitropropane | 0.75 | 0 | 87.5 | 76.9 | 84.6 | 17.9 | | 0 | 0 | 0 | 0 |
| Do | 1.5 | 0 | 100.0 | 97.1 | 100.0 | 39.3 | 78.6 | 28.6 | 4.8 | 0 | 0 |
| Do | 3 | 0 | 90.9 | 96.3 | 100.0 | 100.0 | 100.0 | 81.8 | 14.7 | 0 | 0 |
| Do | 6 | 0 | 96.0 | 91.3 | 100.0 | 100.0 | 100.0 | 100.0 | 100.0 | 12.1 | 0 |
| Do | 9 | 0 | 82.4 | 100.0 | 100.0 | 100.0 | 100.0 | 100.0 | 100.0 | 53.8 | 0.9 |
| Do | 12 | 0 | 97.0 | 100.0 | 100.0 | 100.0 | 100.0 | 100.0 | 100.0 | 62.4 | 29.7 |
| Do | 15 | 0 | 88.0 | 95.8 | 100.0 | 100.0 | 100.0 | 100.0 | 100.0 | 99.3 | 62.0 |
| Do | 18 | 0 | 100.0 | 96.0 | 100.0 | 100.0 | 100.0 | 100.0 | 100.0 | 94.8 | 68.7 |
| Do | 22 | 0 | 87.0 | 100.0 | 100.0 | 100.0 | 100.0 | 100.0 | 100.0 | 100.0 | 93.3 |
| Do | 30 | 0 | 75.0 | 100.0 | 100.0 | 100.0 | 100.0 | 100.0 | 100.0 | 100.0 | 100.0 |
| Do | 45 | 0 | 100.0 | 100.0 | 100.0 | 100.0 | 100.0 | 100.0 | 100.0 | 100.0 | 100.0 |

The results show that the chemical exhibited systemic activity and effectively inhibited *U. striiformis*.

Example 2

The ability to control the plant disease flag smut caused by *Urocystis agropyri* (Preuss) Schroet., when already established in plants, was further evaluated by employing the following technique.

Tests were conducted with infected plants of Merion Kentucky Bluegrass grown in the green house. Plants with infection evident in very tiller were grown in steam-sterilized sandy-loam soil, 3.5 inches deep in 4-inch square plastic pots. Drain holes in the bottom of the pots were sealed with plastic adhesive tape immediately before addition of the chemical. The chemical in a water solution was added by means of a syringe into 2 cm. deep openings in the soil surface at four locations in each pot. Activity was evident by complete inhibition of visible symptoms of flag smut in living leaves of individual tillers. The results were as follows:

TABLE 2

[Inhibition of flag smut, *Urocystis agropyri* (Preuss) Schroet., in Merion Kentucky Bluegrass]

| Treatment | Rate (lbs. per acre) | Percent control — Weeks after treatment | | | | | |
|---|---|---|---|---|---|---|---|
| | | 0 | 5 | 8 | 10 | 12 | 14 |
| Control | None | 0 | 0 | 0 | 0 | 0 | 0 |
| 1,1,1-trichloro-2-hydroxy-3-nitropropane | 1 | 0 | 35.0 | 11.1 | 0 | 0 | 0 |
| Do | 2 | 0 | 24.0 | 9.1 | 0 | 0 | 0 |
| Do | 3 | 0 | 27.8 | 47.4 | 0 | 0 | 0 |
| Do | 4 | 0 | 53.1 | 70.6 | 0 | 0 | 0 |
| Do | 5 | 0 | 58.6 | 56.3 | 0 | 0 | 0 |
| Do | 6 | 0 | 82.9 | 72.2 | 0 | 0 | 0 |
| Do | 8 | 0 | 84.4 | 82.8 | 0 | 37.5 | 0 |
| Do | 10 | 0 | 96.7 | 100.0 | 0 | 57.1 | 1.8 |
| Do | 15 | 0 | 100.0 | 100.0 | 81.1 | 80.0 | 0 |
| Do | 20 | 0 | 100.0 | 100.0 | 91.1 | 86.3 | 94.4 |

The results show that the chemical exhibited systemic activity and effectively inhibited *U. agropyri*.

Example 3

The ability to control the plant disease loose smut caused by *Ustilago nuda* (Jens.) Rostr., when already established in the seed embryo (and which grows systemically in the seedling) was evaluated by employing the following technique.

Five seeds of Larker barley (naturally infected) were planted in 4-inch square plastic pots and allowed to germinate. Four replicates were provided for each treatment. Ten days after planting (when the seedlings were well established) the chemical in a water solution was added by means of a syringe into 2 cm. deep openings in the soil surface at four locations in each pot. Drain holes in the bottom of the pots were sealed with plastic adhesive tape immediately before addition of the chemical. Activity was evident by the inhibition of smut in the barley spikes at heading-time. The results were as follows:

TABLE 3

[Control of loose smut, *Ustilago nuda* (Jens.) Rostr.]

| Treatment | Percent smutted spikes — Rate per acre (lbs.) | | | | | | |
|---|---|---|---|---|---|---|---|
| | 0 | 2 | 5 | 10 | 15 | 20 | 30 |
| Control | 14.29 | 14.29 | 14.29 | 14.29 | 14.29 | 14.29 | 14.29 |
| 1,1,1-trichloro-2-hydroxy-3-nitropropane | 0 | 17.8 | [1] 2.2 | [1] 12.5 | 0 | 0 | 0 |

[1] Partial smutting—spike nearly intact, smut development restricted.

The results indicated that the chemical exhibited systemic activity, and effectively controlled *U. nuda*.

The following examples will illustrates the growth regulating properties of 1,1,1-trichloro-2-hydroxy-3-nitropropane when applied to plants, seedlings and seeds.

Example 4.—Growth regulating—red kidney beans

Red kidney beans were planted in pots in a 1 to 1 soil-sand mixture. When the kidney bean plants germinated and reached the primary leaf stage, 1,1,1-trichloro-2-hydroxy-3-nitropropane was applied as a soil drench in 20 cc. of water to each plant. After twenty days, observations were made to determine plant growth (height in inches). Comparisons with an untreated control at various concentration levels are as follows:

TABLE 4
[Growth regulation, red kidney beans]

| Dosage (p.p.m.) | 2.5 | 5 | 10 | 20 | 40 |
|---|---|---|---|---|---|
| Pounds per acre equivalent | 10 | 20 | 40 | 80 | 160 |
| Untreated control (height in inches) | 12.8 | 12.8 | 12.8 | 12.8 | 12.8 |
| Treated plants (height in inches) | 14.8 | 16.7 | 16.4 | 15.8 | 14.8 |

Example 5.—Growth regulation—tomato seed

Dry tomato seeds were dusted by mixing with an excess of a dust containing 1% of 1,1,1-trichloro-2-hydroxy-3-nitropropane in pyrophyllite. After thorough mixing, the excess dust was separated from the seeds by screening, and the seeds planted on moist blooting paper and maintained at 15° C. for 25 days. The following table shows the percent germination achieved at 18 and 25 days.

TABLE 5

|  | Days | |
|---|---|---|
|  | 18 | 25 |
| Percent germination: | | |
| Control | 3 | 82 |
| Treated seeds | 87 | 96 |

This experiment shows that under the indicated planting conditions the use of 1,1,1-trichloro-2-hydroxy-3-nitropropane produces a germination lead time of approximately 7 days, which is of substantial importance to some crops.

Example 6.—Growth regulation—soybeans

This example illustrates treatment with the chemical by incorporating 1,1,1 - trichloro - 2-hydroxy-3-nitropropane into the soil. The compound was formulated as a 1.0 percent active dust formulation in pyrophyllite. Various amounts of the dust were mixed with a 1:1 sand-soil mix until uniformly distributed. The dosage rates of the chemical were selected as shown below. The treated soil was placed into flats and soybeans planted in the soil. Flats containing untreated soil were also provided. The flats were cultured at ambient greenhouse temperatures for thirty days. The treated plants were compared with the untreated control plants, and a stimulation of growth was observed in the treated plants.

TABLE 6

|  | P.p.m. | | | | |
|---|---|---|---|---|---|
|  | 0.5 | 1 | 1.5 | 2 | 2.5 |
| Pounds/acre equivalent | 2 | 4 | 6 | 8 | 10 |
| Control (height in inches) | 6.5 | 6.5 | 6.5 | 6.5 | 6.5 |
| Treated (height in inches) | 8.7 | 9.5 | 7.8 | 8.5 | 8.7 |

The foregoing examples illustrate a method for regulating the growth of plant life and for systematically controlling fungal infections in said plant life, which comprises maintaining an effective concentration of 1,1,1-trichloro-2-hydroxy-3-nitropropane in the growth environment of said plant life to permit the systemic assimilation thereof by the plant in amounts sufficient to regulate the growth of the plant life or to systemically control the fungal infections or both, as may be desired.

It should be understood that the growth regulating aspects of the present process are not dependent upon the systemic fungicidal effects described herein and that there are many situations where the fungicidal effect is of subordinate importance to the growth regulating aspects of the process. Likewise in those instances where fungal infections of the plant life exist, the amelioration of which is of paramount importance, a growth regulating effect may be achieved by the application of the compound, but the two phenomena are not interdependent.

It should also be understood that the term plant life, as used herein, refers to plant life in various stages of growth, form or development, including seed, seedling, adult form, tuber, cutting, eye, or other propagating form conventionally used in the commercial or economic propagation of the species.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:
1. A process for systemically controlling fungal infections of plant life forms caused by a fungi of the genera selected from the group consisting of *Ustilago striiformis, Urocystis agropyri* and *Ustilago nuda,* which comprises applying the compound 1,1,1-trichloro-2-hydroxy-3-nitropropane to said plant life forms by a procedure selected from the group consisting of:
   (a) application to the soil habitat of the plant at a rate of from about ¼ to 60 pounds per acre; and
   (b) application to plant seeds at a rate of from 1 to 10,000 parts per million
to thereby permit the systemic assimilation thereof by the plant to systemically control the fungal infection.

2. A process according to claim 1 wherein said compound is applied in conjunction with an inert, inactive carrier.

3. A process according to claim 1 wherein said compound is applied broadcast to the plant life environment at a rate of at least about one-half pound to forty pounds per acre.

References Cited

Bates et al.: Ann. Appl. Biology (1963), 51, 153–160.
Chemical Abstracts (I) vol. 61, 2971 (c), 1964.
Chemical Abstracts (II) vol. 62, 3918 (b), 1965.
Plant Disease Reporter vol. 38, No. 11, Nov. 15, 1954.

ALBERT T. MEYERS, Primary Examiner

N. A. DREZIN, Assistant Examiner

U.S. Cl. X.R.
71—122; 260—633